UNITED STATES PATENT OFFICE 2,231,067

PREPARATION OF MICHLER'S KETONE

Philip D. Hammond, Metuchen, and Robert W. Harris, Raritan Township, Middlesex County, N. J., assignors to Heyden Chemical Corporation, New York, N. Y., a corporation of New York No Drawing. Application April 28, 1939, Serial No. 270,510

4 Claims. (Cl. 260—570)

This invention involves a new and improved method of making Michler's ketone having the formula

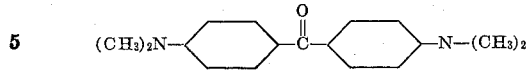

It is also known as 4,4' tetramethyldiamino benzophenone or bis (p dimethyl aminophenyl) ketone.

The importance and value of Michler's ketone in the preparation of triphenylmethane and diphenylnaphthyl methane dyes has been appreciated by dye manufacturers for many years, and various methods have been proposed for its manufacture. Some have proved non-commercial because of the expense of or difficulty in preparing one or more of the reactants. Others have given very low yield. Others require an exceedingly long reaction period, and others have been objectionable for other reasons.

The main object of the present invention is to provide a simple and inexpensive process which overcomes or avoids the difficulties and objections heretofore encountered.

In carrying out the present invention dichlorbenzophenone is caused to react with dimethylamine to produce the tetramethyldiaminobenzophenone directly. By this method it has been found possible to obtain a yield of 96% or more of the pure Michler's ketone. The dimethylamine is preferably a 25% aqueous solution, and the reaction with the 4,4' dichlorbenzophenone is preferably in the presence of a catalyst such as copper or a copper compound, and at a temperature of 150° C. to 300° C. in a sealed autoclave under superatmospheric pressure.

As an example:

150 grams of 4,4'-dichlor benzophenone (M. P. 147° C.) were placed in a copper-lined pressure autoclave equipped with copper baffles. 10 grams of cuprous chloride, 10 grams of cupric oxide and 1200 cc. of aqueous solution of 25% dimethylamine were then added. The autoclave was sealed, placed in an electrically heated lead bath, and rotated for 27 hours at 230° C. The autoclave was removed from the bath, allowed to cool, opened, and the supernatant dimethylamine solution decanted. The solid product was removed from the autoclave, dissolved in hydrochloric acid, filtered from the solid particles of copper, and diluted to a volume of three liters. The acid solution was neutralized with aqueous ammonia, cooled and filtered. The light brown product was washed with water, sucked dry, and spread out to dry in an oven at 105° C. until the product was thoroughly dry. The solid took on a greenish blue appearance, and weighed 155 grams, which is equivalent to a 96.3% yield based on the 4,4'-dichlorbenzophenone. The product contained 0.17% ash, and melted at 171-173° C.

For the production of the ketone 2 mols of dimethylamine are required for 1 mol of dichlorbenzophenone to replace the chlorine atoms of the latter and release hydrogen chloride. As a neutralizing agent for the produced hydrogen chloride, it is preferable to use 2 additional mols of dimethylamine. Thus, preferably the process requires 4 mols of dimethylamine, but other neutralizing agents such as caustic soda might be employed. In practice, a slight excess of the molecular requirement of dimethylamine is used.

In the example, the dimethylamine is in an aqueous solution but it may be in solution in other solvents such as methanol, ethanol, etc., and the concentration which is given as 25% may be lower or higher, for instance, from 10% to 40%.

Having thus described our invention, what we claim as new and desire to secure by Letters Patent is:

1. The process for the production of 4,4'-tetramethyldiamino benzophenone, which consists in reacting dimethylamine with 4,4'-dichlorbenzophenone, in the presence of a catalyst selected from the group consisting of copper and copper compounds capable of forming a complexion with dimethylamine at a temperature between about 150° and about 300° C., and at a corresponding autogenic superatmospheric pressure.

2. The process for the production of 4,4'-tetramethyldiamino benzophenone, which consists in reacting at least 2 mols of dimethylamine with 1 mol of 4,4'-dichlorbenzophenone, in the presence of a catalyst selected from the group consisting of copper and copper compounds capable of forming a complex ion with dimethylamine at a temperature between about 150° and about 300° C., and at a corresponding autogenic superatmospheric pressure.

3. The process for the production of 4,4'-tetramethyldiamino benzophenone, which consists in reacting at least 4 mols of dimethylamine with 1 mol of 4,4'-dichlorbenzophenone, in the presence of a catalyst selected from the group consisting of copper and copper compounds capable of forming a complex ion with dimethylamine at a temperature between about 150° and about 300° C., and at a corresponding autogenic superatmospheric pressure.

4. The process for the production of 4,4'-tetramethyldiamino benzophenone, which consists in reacting an aqueous solution of dimethylamine with 4,4'-dichlorbenzophenone, in the presence of a catalyst selected from the group consisting of copper and copper compounds capable of forming a complex ion with dimethylamine at a temperature between about 150° and about 300° C., and at a corresponding autogenic superatmospheric pressure.

PHILIP D. HAMMOND.
ROBERT W. HARRIS.